United States Patent
Yan

(10) Patent No.: US 9,344,880 B2
(45) Date of Patent: May 17, 2016

(54) DIALING METHOD AND DEVICE

(71) Applicant: ZTE CORPORATION, Shenzhen, Guangdong Province (CN)

(72) Inventor: Haiqing Yan, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/408,981

(22) PCT Filed: May 22, 2013

(86) PCT No.: PCT/CN2013/076068
§ 371 (c)(1),
(2) Date: Dec. 18, 2014

(87) PCT Pub. No.: WO2014/000542
PCT Pub. Date: Jan. 3, 2014

(65) Prior Publication Data
US 2015/0341783 A1    Nov. 26, 2015

(30) Foreign Application Priority Data
Jun. 28, 2012 (CN) .......................... 2012 1 0218574

(51) Int. Cl.
*H04M 3/42* (2006.01)
*H04W 8/28* (2009.01)
(Continued)

(52) U.S. Cl.
CPC .......... *H04W 8/28* (2013.01); *H04M 1/274516* (2013.01); *H04M 1/274566* (2013.01); *H04M 1/56* (2013.01); *H04M 1/72572* (2013.01); *H04M 3/42306* (2013.01); *H04M 1/2535* (2013.01)

(58) Field of Classification Search
CPC ..... H04W 8/28; H04M 3/42306; H04M 1/56; H04M 1/2535; H04M 1/72572; H04M 1/274516; H04M 1/274566
USPC ................. 455/414.1, 414.2, 445, 410, 550.1
See application file for complete search history.

(56) References Cited

U.S. PATENT DOCUMENTS 8,923,812 B1 * 12/2014 Koum ...................... H04W 4/14
455/410
2005/0176411 A1 * 8/2005 Taya .................. H04M 1/72572
455/414.1
(Continued)

FOREIGN PATENT DOCUMENTS

CN      1653788 A      8/2005
CN      1665335 A      9/2005
(Continued)

*Primary Examiner* — Khai M Nguyen
(74) *Attorney, Agent, or Firm* — Ling Wu; Stephen Yang; Ling and Yang Intellectual Property

(57) ABSTRACT

A dialing method and device are disclosed. The method includes: a terminal acquiring dialing auxiliary data information, wherein, the dialing auxiliary data information comprises home location information and/or roaming location information; after receiving a dialed number of a subscriber, the terminal judging whether the dialed number conforms to a dialing rule according to the dialing auxiliary data information; and in a case that the terminal judges that the dialed number does not conform to the dialing rule, correcting the dialed number, and calling out the corrected dialed number. With the method and device, a problem of a higher network call loss rate in the related art is solved, a dialing success rate of the subscriber is increased, and the user experience is improved.

11 Claims, 3 Drawing Sheets

(51) Int. Cl.
  *H04M 1/2745* (2006.01)
  *H04M 1/56* (2006.01)
  *H04M 1/725* (2006.01)
  *H04M 1/253* (2006.01)

(56) References Cited

U.S. PATENT DOCUMENTS

2010/0159954 A1* 6/2010 Rahman ............ H04W 4/02
　　　　　　　　　　　　　　　　　455/456.3

2012/0135721 A1* 5/2012 Gao ............... H04M 1/274566
　　　　　　　　　　　　　　　　　455/414.1

FOREIGN PATENT DOCUMENTS

| CN | 101098553 A | 1/2008 |
| CN | 101640727 A | 2/2010 |
| DE | 19711096 A1 | 9/1998 |
| EP | 1505805 A1 | 9/2005 |
| EP | 1659817 A2 | 5/2006 |
| EP | 2456180 A1 | 5/2012 |

* cited by examiner

DIALING METHOD AND DEVICE

TECHNICAL FIELD

The present document relates to the field of communication, and specifically, to a dialing method and device.

BACKGROUND OF THE RELATED ART

In the current communication system, a subscriber making a call by dialing on the terminal is common practice. But when a correct number is dialed especially for the subscriber in international roaming, how to guarantee a correct dialing and come into contact with a friend who is to be contacted in time is very important.

In the related art, the number can be reported to a network by dialing, and the network judges a correctness of the dialing, thereby completing the connection. But if the subscriber is unfamiliar with dialing rules to cause dialing incorrectly, the call of this time is failed, which brings inconvenience to the subscriber, and also brings certain network loads and fails in achieving an effective connection in the meantime, thereby causing a certain amount of call loss.

Some other terminals provide certain auxiliary functions for the subscriber with respect to the international dialing, for instance, a function of converting a "+" number dialed by the subscriber into a corresponding international dialing prefix, for another instance, automatic adding of an Internet Protocol (IP) dialing prefix and so on.

However, the existing way has the following limitations.

1. Incontestably, when the number is reported to a dialing address of the network, the network judges a correctness of the number, however, it seems too late that it has been impossible for an incorrect number to be connected successfully, which causes that a call loss rate of the network cannot be reduced.

2. The functions such as the "+" number conversion function added by the terminal and the automatic adding of the IP dialing prefix are also extremely limited, only a prefix is added before the original number, which cannot guarantee that the number is reported to the network as accurately as possible to ensure a successful connection.

With respect to the problem of the higher network call loss rate in the related art, no effective scheme is proposed at present.

SUMMARY

With respect to the problem of the higher network call loss rate in the related art, the example of the present document provides a dialing method and device, to at least solve the above problem.

The example of the present document provides a dialing method, which comprises:

a terminal acquiring dialing auxiliary data information, wherein, the dialing auxiliary data information comprises home location information and/or roaming location information;

after receiving a dialed number of a subscriber, the terminal judging whether the dialed number conforms to a dialing rule according to the dialing auxiliary data information; and in a case that the terminal judges that the dialed number does not conform to the dialing rule, correcting the dialed number, and calling out the corrected dialed number.

Alternatively, the step of the terminal judging whether the dialed number conforms to the dialing rule according to the dialing auxiliary data information after receiving the dialed number of the subscriber comprises:

after the terminal receives the dialed number of the subscriber, judging whether an auxiliary dialing switch is ON;

in a case that the terminal judges that the auxiliary dialing switch is ON, judging whether the dialed number conforms to the dialing rule according to the dialing auxiliary data information; and in a case that the terminal judges that the auxiliary dialing switch is OFF, calling out the dialed number.

Alternatively, the step of the terminal judging whether the dialed number conforms to the dialing rule according to the dialing auxiliary data information after receiving the dialed number of the subscriber comprises:

in a case that the terminal performs dialing in a home location and a length of the dialed number is greater than a length of a domestic direct dialed number, the terminal judging whether the dialed number conforms to the dialing rule according to the home location information of the terminal.

Alternatively, the step of the terminal judging whether the dialed number conforms to the dialing rule according to the home location information of the terminal after receiving the dialed number of the subscriber comprises:

in a case that the dialed number begins with a Domestic Direct Dialing (DDD) Prefix of the home location plus an area code, and the length of the dialed number is a sum of the length of the domestic direct dialed number plus a length of the DDD Prefix plus a length of the area code, the dialed number conforming to a dialing rule of domestic direct distance dialing; or, in a case that the dialed number begins with an International Direct Dialing (IDD) Prefix of the home location plus a country code, and the length of the dialed number is a sum of a length of an international direct dialed number plus a length of the IDD Prefix plus a length of the country code, the dialed number conforming to a dialing rule of international direct distance dialing; or, in a case that the terminal judges that the dialed number does not conform to the dialing rule, the dialed number not conforming to the dialing rule.

Alternatively, the step of correcting the dialed number in the case that the terminal judges that the dialed number does not conform to the dialing rule comprises:

in a case that the dialed number begins with the DDD Prefix of the home location and/or begins with the area code, the terminal correcting the dialed number according to the dialing rule of the domestic direct distance dialing; or, in a case that the dialed number begins with other numbers, the terminal correcting the dialed number according to the dialing rule of the international direct distance dialing.

Alternatively, the step of correcting the dialed number in the case that the terminal judges that the dialed number does not conform to the dialing rule comprises:

in a case that the dialed number begins with a non-numeric symbol, the terminal deleting the non-numeric symbol or replacing the non-numeric symbol with an array corresponding to the non-numeric symbol, and correcting the dialed number according to a beginning of the dialed number after the deletion or replacement.

Alternatively, before the step of the terminal judging whether the dialed number conforms to the dialing rule according to the home location information of the terminal, the method further comprises:

in a case that the length of the dialed number is the length of the domestic direct dialed number, the terminal calling out the dialed number.

Alternatively, the step of the terminal judging whether the dialed number conforms to the dialing rule according to the dialing auxiliary data information comprises:

in a case that the terminal performs dialing in a roaming location, the terminal judging whether the dialed number conforms to the dialing rule according to the roaming location information of the terminal.

Alternatively, the step of the terminal judging whether the dialed number conforms to the dialing rule according to the roaming location information of the terminal comprises:

in a case that the dialed number begins with a DDD Prefix of the roaming location plus an area code, and the length of the dialed number is a sum of the length of the domestic direct dialed number plus the length of the DDD Prefix plus the length of the area code, the terminal judging that the dialed number conforms to a dialing rule of domestic direct distance dialing of the roaming location; or, in a case that the dialed number begins with an IDD Prefix of the roaming location plus a country code, and the length of the dialed number is a sum of the length of the international direct dialed number plus the length of the IDD Prefix plus the length of the country code, the terminal judging that the dialed number conforms to a dialing rule of international direct distance dialing of the roaming location; or, in a case that the terminal judges that the dialed number does not conform to the dialing rule, the dialed number not conforming to the dialing rule.

Alternatively, the step of correcting the dialed number in the case that the terminal judges that the dialed number does not conform to the dialing rule comprises:

in a case that the dialed number begins with the IDD Prefix of the roaming location and/or begins with the country code of the roaming location, the terminal correcting the dialed number according to the dialing rule of the domestic direct distance dialing of the roaming location; or, in a case that the dialed number begins with other numbers, the terminal correcting the dialed number according to the dialing rule of the international direct distance dialing of the roaming location.

Alternatively, the step of correcting the dialed number in the case that the terminal judges that the dialed number does not conform to the dialing rule comprises:

in a case that the dialed number begins with a non-numeric symbol, the terminal deleting the non-numeric symbol or replacing the non-numeric symbol with an array corresponding to the non-numeric symbol, and correcting the dialed number according to a beginning of the dialed number after the deletion or replacement.

The example of the present document further provides a dialing device, which is applied to a terminal; the dialing device comprises:

an acquisition module, configured to: acquire dialing auxiliary data information, wherein, the dialing auxiliary data information comprises home location information and/or roaming location information;

a judgment module, configured to: after the terminal receives a dialed number of a subscriber, judge whether the dialed number conforms to a dialing rule according to the dialing auxiliary data information; and a correction module, configured to: in a case that the judgment module judges that the dialed number does not conform to the dialing rule, correct the dialed number, and call out the corrected dialed number.

Alternatively, the judgment module comprises:

a first judgment unit, configured to: after the terminal receives the dialed number of the subscriber, judge whether an auxiliary dialing switch is ON;

a second judgment unit, configured to: in a case that the first judgment unit judges that the auxiliary dialing switch is ON, judge whether the dialed number conforms to the dialing rule according to the dialing auxiliary data information; and a call out unit, configured to: in a case that the first judgment unit judges that the auxiliary dialing switch is OFF, call out the dialed number.

With the method and device of the example of the present document, before the terminal calls out the dialed number, the dialed number of the subscriber is checked and corrected, thereby guaranteeing the correctness of the dialed number called out, solving the problem of the higher network call loss rate in the related art, increasing a dialing success rate of the subscriber, and improving the user experience.

BRIEF DESCRIPTION OF DRAWINGS

Here, the described accompanying drawings are used to provide a further understanding of the example of the present document and constitute a part of the present document. The schematic examples and illustrations thereof of the present document are used to explain the technical scheme of the present document, but do not constitute an inappropriate limitation on the technical scheme of the present document. In the drawings.

PREFERRED EMBODIMENTS OF THE INVENTION

The technical scheme of the present document will be described in detail with reference to the accompanying drawings and in combination with the examples below. It should be noted that the examples in the present document and the characteristics in the examples can be combined with each other in the condition of no conflict.

Figure 1:
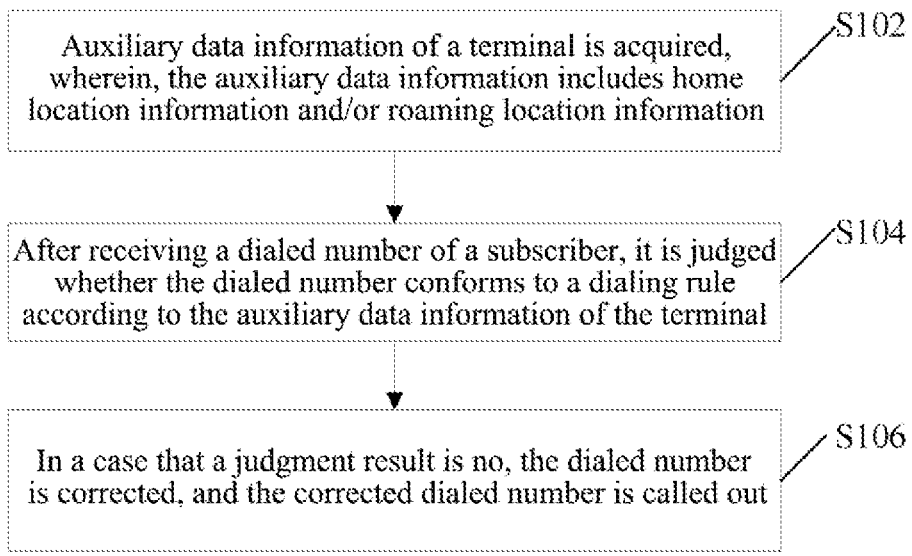
FIG. 1 is a flow diagram of the dialing method according to the example of the present document.

A dialing method is provided in the example, FIG. 1 is a flow diagram of the dialing method according to the example of the present document, and as shown in FIG. 1, the method includes the following steps.

In step 102, a terminal acquires dialing auxiliary data information, wherein, the dialing auxiliary data information includes home location information and/or roaming location information.

In step 104, after receiving a dialed number of a subscriber, the terminal judges whether the dialed number conforms to a dialing rule according to the dialing auxiliary data information.

In step 106, in a case that the terminal judges that the dialed number does not conform to the dialing rule, the dialed number is corrected, and the corrected dialed number is called out.

In the example, through the above steps, after receiving the dialed number of the subscriber, whether the dialed number conforms to the dialing rule is judged according to the dialing auxiliary data information, in a case that the dialed number does not conform to the dialing rule, the dialed number is corrected, and the corrected dialed number is called out. In this way, before the terminal calls out the dialed number, the dialed number of the subscriber can be checked and corrected, thereby guaranteeing the correctness of the dialed number called out, solving the problem of the higher network call loss rate in the related art, increasing a dialing success rate of the subscriber, and improving the user experience.

As a preferred embodiment, an auxiliary dialing switch can be set, and it is used for opening or closing a dialing calibration function of the example. In this case, after receiving the dialed number of the subscriber, whether the auxiliary dialing switch is ON can be firstly judged, if ON, whether the dialed number conforms to the dialing rule can be judged according to the dialing auxiliary data information; and if not ON, no judgment is performed on the dialed number, and the dialed number is directly called out. In this way, energy consumption of the terminal can be reduced without using the function.

As a preferred embodiment, when the terminal performs dialing in a home location, in a case that a length of the received dialed number is a length of a domestic direct dialed number, the dialing can default to correct, thereby calling out the dialed number directly without calibration; and in a case that the length of the dialed number is greater than the length of the domestic direct dialed number, whether the dialed number conforms to the dialing rule can be judged according to the home location information of the terminal.

For example, in a case that the dialed number begins with a Domestic Direct Dialing (DDD) Prefix of the home location plus an area code, and the length of the dialed number is a sum of the length of the domestic direct dialed number plus a length of the DDD Prefix plus a length of the area code, it is believed that the dialed number conforms to a dialing rule of domestic direct distance dialing; or, in a case that the dialed number begins with an International Direct Dialing (IDD) Prefix of the home location plus a country code, and the length of the dialed number is a sum of a length of an international direct dialed number plus a length of the IDD Prefix plus a length of the country code, it is believed that the dialed number conforms to a dialing rule of international direct distance dialing; or, in a case that the terminal judges that the dialed number does not conform to the dialing rule, it is believed that the dialed number does not conform to the dialing rule. Whether the dialed number conforms to the dialing rule of the home location can be discerned conveniently in this way, which is convenient and easy and has a strong practicability.

Alternatively, in the case that the dialed number does not conform to the dialing rule of the home location, the dialed number can be corrected in one of the following ways: in a case that the dialed number begins with the DDD Prefix of the home location and/or begins with the area code, the dialed number can be corrected according to the dialing rule of the domestic direct distance dialing; or, in a case that the dialed number begins with other numbers, the dialed number can be corrected according to the dialing rule of the international direct distance dialing. Moreover, in a case that the dialed number begins with a non-numeric symbol (e.g., beginning with a symbol such as "+" or "#"), the non-numeric symbol can be deleted or the non-numeric symbol can be replaced with an array corresponding to the non-numeric symbol, and the dialed number is corrected according to a beginning of the dialed number after the deletion or replacement.

As another preferred embodiment, when the terminal performs dialing in a roaming location, whether the dialed number conforms to the dialing rule can be judged according to the roaming location information of the terminal.

For example, in a case that the dialed number begins with a DDD Prefix of the roaming location plus an area code, and the length of the dialed number is a sum of the length of the domestic direct dialed number plus a length of the DDD Prefix plus a length of the area code, it is believed that the dialed number conforms to a dialing rule of domestic direct distance dialing of the roaming location; or, in a case that the dialed number begins with an IDD Prefix of the roaming location plus a country code, and the length of the dialed number is a sum of the length of the international direct dialed number plus the length of the IDD Prefix plus the length of the country code, it is believed that the dialed number conforms to a dialing rule of international direct distance dialing of the roaming location; or, in a case that the terminal judges that the dialed number does not conform to the dialing rule, it is believed that the dialed number does not conform to the dialing rule of the roaming location.

Alternatively, in the case that the dialed number does not conform to the dialing rule of the roaming location, the dialed number can be corrected in one of the following ways: in a case that the dialed number begins with the IDD Prefix of the roaming location and/or begins with the country code of the roaming location, the dialed number can be corrected according to the dialing rule of the domestic direct distance dialing of the roaming location; or, in a case that the dialed number begins with other numbers, the dialed number can be corrected according to the dialing rule of the international direct distance dialing of the roaming location. Moreover, in a case that the dialed number begins with a non-numeric symbol (e.g., beginning with a symbol such as "+" or "#"), the non-numeric symbol can be deleted or the non-numeric symbol can be replaced with an array corresponding to the non-numeric symbol, and the dialed number is corrected according to a beginning of the dialed number after the deletion or replacement.

Corresponding to the above method, a dialing device is also provided in the example, the device is used for implementing the above examples and preferred embodiments, and the contents that have been described will not be repeated. For example, a term "module" used below can be a combination of software and/or hardware for implementing preset functions. Though the device described in the following examples is preferentially implemented by software, an implementation by hardware or a combination of software and hardware is also possible and conceived.

Figure 2:
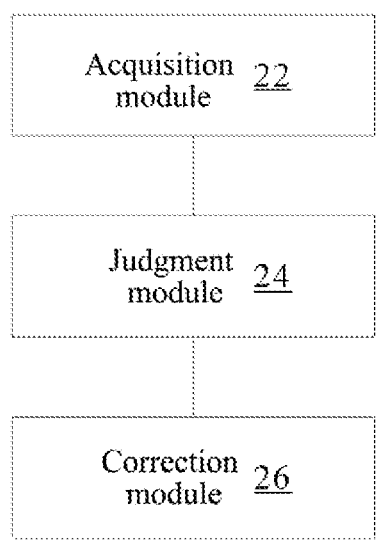
FIG. 2 is a block diagram of a structure of the dialing device according to the example of the present document.

FIG. 2 is a block diagram of a structure of the dialing device according to the example of the present document, as shown in FIG. 2, the device includes: an acquisition module 22, a judgment module 24 and a correction module 26, and each module will be described in detail below.

The acquisition module 22 is configured to: acquire dialing auxiliary data information, wherein, the dialing auxiliary data information includes home location information and/or roaming location information; the judgment module 24 is configured to: connect with the acquisition module 22, and after the terminal receives a dialed number of a subscriber, judge whether the dialed number conforms to a dialing rule according to the dialing auxiliary data information; and the correction module 26 is configured to: connect with the judgment module 24, and in a case that the judgment module 24 judges that the dialed number does not conform to the dialing rule, correct the dialed number, and call out the corrected dialed number.

In the example, through the above modules, after receiving the dialed number of the subscriber, whether the dialed number conforms to the dialing rule is judged by the judgment module 24 according to the dialing auxiliary data information acquired by the acquisition module 22, in a case that it does not conform to the dialing rule, the dialed number is corrected by the correction module 26, and the corrected dialed number is called out. In this way, before the terminal calls out the dialed number, the dialed number of the subscriber can be checked and corrected, thereby guaranteeing the correctness of the dialed number called out, solving the problem of the higher network call loss rate in the related art, increasing a dialing success rate of the subscriber, and improving the user experience.

Figure 3:
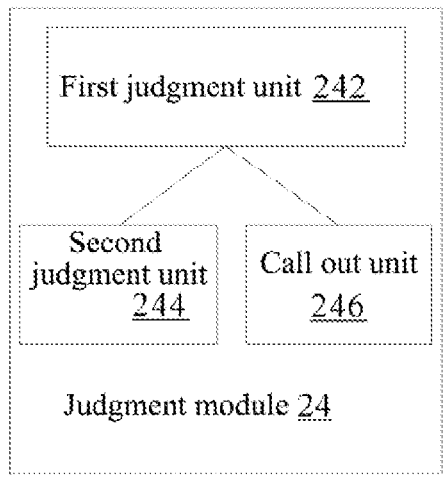
FIG. 3 is a block diagram of a preferred structure of the judgment module according to the example of the present document.

FIG. 3 is a block diagram of preferred structure of the judgment module 24 according to the example of the present document, as shown in FIG. 3, the judgment module 24 can include: a first judgment unit 242, a second judgment unit 244 and a call out unit 246.

The first judgment unit 242 is configured to: after the terminal receives the dialed number of the subscriber, judge whether an auxiliary dialing switch is ON; the second judgment unit 244 is configured to: connect with the first judgment unit 242, and in a case that the first judgment unit 242 judges that the auxiliary dialing switch is ON, judge whether the dialed number conforms to the dialing rule according to the dialing auxiliary data information; and the call out unit 246 is configured to: connect with the first judgment unit 242, and in a case that the first judgment unit 242 judges that the auxiliary dialing switch is OFF, call out the dialed number.

Descriptions will be made in combination with the preferred examples below, and the following preferred examples are combined with the above examples and preferred embodiments thereof.

A method and device for terminal auxiliary dialing are provided in the preferred examples, through a dialed number auxiliary correction function of the terminal, the correctness of dialing can be promoted to a great extent, which guarantees a connection success and reduces the call loss.

Through a dialing auxiliary function of the terminal side provided in the preferred examples, an auxiliary correction is performed on the number dialed by the subscriber, which promotes an effectiveness of the subscriber making a call. Hereinafter, how to implement the auxiliary correction of the number dialed by the subscriber in the terminal is mainly described, which enables the terminal to make calls accurately furthest, thereby enabling the terminal to call successfully and bringing good user experience.

Figure 4:
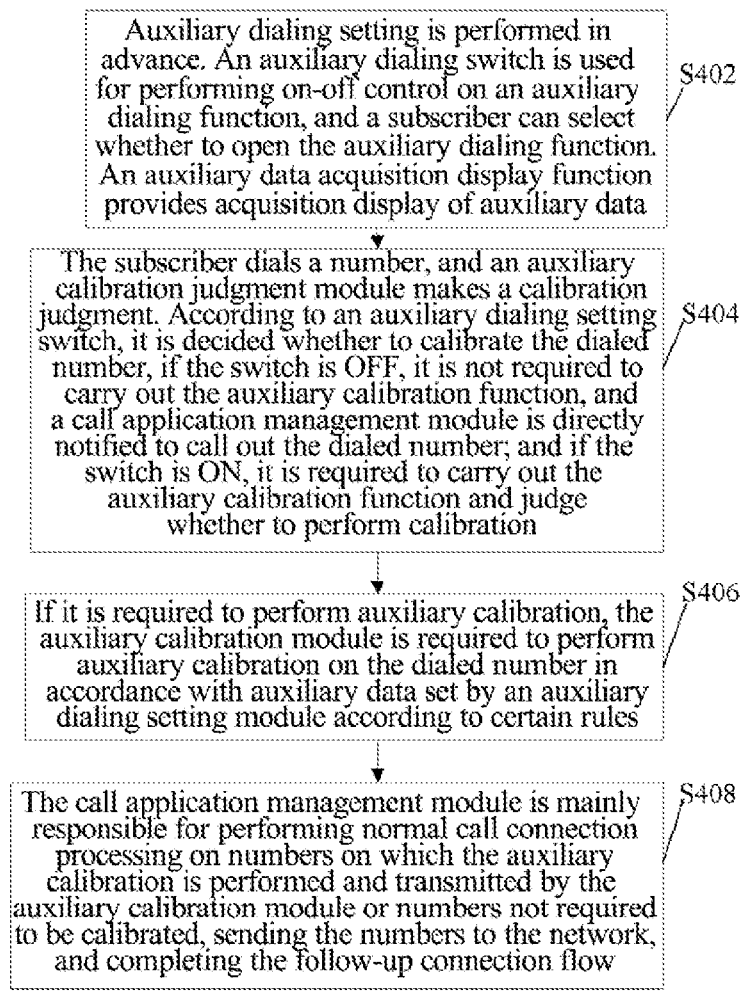
FIG. 4 is a flow diagram of a method for terminal auxiliary dialing according to the preferred example of the present document.

FIG. 4 is a flow diagram of the method for terminal auxiliary dialing according to the preferred example of the present document, and as shown in FIG. 4, the method for terminal auxiliary dialing provided in the preferred example includes the following steps.

In step S402, auxiliary dialing setting is performed in advance, and a setting process is implemented through an auxiliary dialing setting module. The setting includes setting an auxiliary dialing switch and an auxiliary data acquisition display function. The auxiliary dialing switch is used for performing on-off control on an auxiliary dialing function, the subscriber can select whether to open the auxiliary dialing function; the auxiliary data acquisition display function provides acquisition display of auxiliary data, and the auxiliary data include the following parts.

1. Home location information: including a home location country name, a Mobile Country Code (MCC), an International Direct Dialing (IDD) Prefix, a Domestic Direct Dialing (DDD) Prefix, and a length of the domestic direct distance dialed number. This part of information can be displayed according to the home location information registered when the subscriber opens an account.

2. Roaming location information: including a name of region country in which the terminal roams currently, an MCC, an IDD Prefix and a DDD Prefix; this part of information can be displayed by querying the corresponding dialing prefixes Local IDD Prefix and DDD Prefix according to the MCC registered when the current subscriber position updates.

In step S404, the subscriber dials a number, and an auxiliary calibration judgment module makes a calibration judgment. According to an auxiliary dialing setting switch, it is decided whether to calibrate the dialed number, if the switch is OFF, it is not required to carry out the auxiliary calibration function, and a call application management module is directly notified to call out the dialed number; and if the switch is ON, it is required to carry out the auxiliary calibration function and judge whether to perform calibration.

In step S406, if it is required to perform auxiliary calibration, the auxiliary calibration is performed on the dialed number according to auxiliary calibration rules. The following steps are included in the auxiliary calibration rules. In step A, according to whether the subscriber is in roaming (that can be acquired through registration information), different calibration rules are determined. In step B, if the number is dialed in the home location, auxiliary data of the home location, including information of an MCC, an IDD Prefix, a DDD Prefix and a length of the domestic direct distance dialed number, are acquired from the auxiliary dialing setting module, an analysis judgment is performed on the dialed number, if it conforms to a calibration rule, calibration is performed; if the number is dialed in the roaming location, auxiliary data of the current roaming location, including information of an MCC, an IDD Prefix and a DDD Prefix, are acquired from the auxiliary dialing setting module, an analysis judgment is performed on the dialed number, if it conforms to a calibration rule, calibration is performed.

In step B, the specific calibration rules are described as follows.

1. The subscriber dials the number in the home location.

The auxiliary data of the home location, including information of the MCC, the IDD Prefix, the DDD Prefix and the length of the domestic direct distance dialed number, are acquired from the auxiliary dialing setting module, firstly it is judged whether the dialed number is the domestic direct distance dialed number according to the number length information, if the length of the dialed number is within a length range of the domestic direct dialed number, it is determined that the dialing is the domestic direct dialing, no calibration is performed, and the call application management module is directly notified to call out; and if the length of the dialed number is greater than the length of the domestic direct dialed number, an attribute of the number at the beginning is judged so as to determine whether the dialed number is the domestic direct dialed number or the international direct dialed number, and corresponding calibration is performed according to a domestic direct dialed number attribute or an international direct dialed number attribute. The dialed numbers not belonging to the following situations are not required to be calibrated, and the call application management module is directly notified to call out.

Descriptions will be made by taking contents in the annotation as an example below.

[Annotation]: Home location—China; Country code of home location—86; IDD Prefix of home location—00; DDD Prefix of home location—0; Area code—21; Other country—England; Other country code—44.

Situation 1: A case that it can be judged as the domestic direct dialed number is described below.

(1) When the dialed number begins with the DDD Prefix of the home location plus the area code, and the number length is a length of the domestic direct distance dialed number+a length of the DDD Prefix+a length of the area code, no correction is made, and the call application management module is directly notified to call out.

For example, if a number 02188459418 is dialed in the home location China, this number is a correct number, no calibration is required, and it is to directly call out.

(2) When the dialed number begins with the area code, and the number length is a length of the domestic direct distance dialed number+a length of the area code, it is required to make a correction, and after the DDD Prefix of the home location is added before the number, the call application management module is notified to call out.

For example, if a number 2188459418 is dialed in the home location China, this number is required to be calibrated as 02188459418.

(3) When the dialed number begins with the "+" number, and the number plus the DDD Prefix and starting with the area code is also determined as the domestic direct distance dialing, but when it is required to be calibrated, the "+" number is removed, and the call application management module is directly notified to call out.

For example, if a number +02188459418 is dialed in the home location China, this number is required to be calibrated as 02188459418.

Situation 2: A case that it can be judged as the international direct dialed number is described below.

(1) When the dialed number does not begin with the DDD Prefix of the locating position (home location), and it also does not start with the area code of the current country or the "+" number, it is required to be calibrated as an international direct dialed number, the IDD Prefix of the current country area needs to be added before the number, and then the call application management module is directly notified to call out.

For example, if a number 449876543211 is dialed in the home location China, 44 is another country code (England), and this number is required to be calibrated as 00449876543211.

(2) When the dialed number begins with the IDD Prefix of the country where it is located plus the country code, it is determined as the international direct dialing, no calibration and correction is made, and the call application management module is directly notified to call out.

For example, if a number 00449876543211 is dialed in the home location China, this number is not required to be calibrated.

(3) When the dialed number begins with the "+" plus the country code, the international direct dialed number needs to be calibrated, the "+" is replaced with the IDD Prefix of the current region or country, and the call application management module is directly notified to call out.

For example, if a number +449876543211 is dialed in the home location China, this number is required to be calibrated as 00449876543211.

2. The subscriber is in roaming and leaves the home location to dial the number.

Firstly, auxiliary data of the current roaming location, including information of the MCC, IDD Prefix and DDD Prefix, are acquired from the auxiliary dialing setting module, the dialed number is analyzed and judged, and if it confirms to the calibration rules, the calibration is performed. By judging an attribute of the beginning number of the dialed number, it is judged whether the dialed number is a domestic direct dialed number or an international direct dialed number, the corresponding calibration is performed according to an attribute of the domestic direct dialed number or an attribute of the international direct dialed number, the dialed numbers not in the following cases are not required to be calibrated, and the call application management module is directly notified to call out.

Descriptions will be made by taking contents in the annotation as an example below.

[Annotation]: Roaming location—America; Country code of roaming location—1; IDD Prefix of roaming location—011; DDD Prefix of roaming location—1; Area code—908; Other country—England; Other country code—44.

Situation 1: A case that it can be judged as the domestic direct dialed number is described below.

(1) When the dialed number begins with the "+" number+ the country code, and the country code is identical with the country code of the roaming location, the dialed number is a local number. The dialed number needs to be calibrated as that: the "+" number+the country code are replaced with the DDD Prefix of the roaming location of the subscriber, and then the call application management module is notified to call out.

For example, if a number +19087654328 (1 is the country code of America) is dialed in the roaming location America, this number is required to be calibrated as 19087654328 (1 is the DDD Prefix of America).

(2) When the dialed number begins with the IDD Prefix of the roaming location+the country code, and the country code is identical with the country code of the roaming location, the dialed number is a local number. The dialed number needs to be calibrated as that: the IDD Prefix+the country code are replaced with the DDD Prefix, and then the call application management module is notified to call out.

For example, if a number 01119087654328 (1 after 011 is the country code of America) is dialed in the roaming location America, this number is required to be calibrated as 19087654328 (1 is the DDD Prefix of America).

(3) When the dialed number begins with the DDD Prefix of the roaming location country+the area code, no correction is made, and the call application management module is directly notified to call out.

For example, if a number 19087654328 (1 is the DDD Prefix of America) is dialed in the roaming location America, the number is not required to be calibrated.

Situation 2: A case that it can be judged as the international direct dialed number is described below.

(1) When the dialed number begins with the "+" number, and a number after the "+" number is a country code of a non-roaming location, the calibration is required, the "+" is replaced with the IDD Prefix of the roaming location country, and then the call application management module is notified to call out.

For example, if a number +449876543211 is dialed in the roaming location America, this number is required to be calibrated as 011449876543211.

(2) When the dialed number begins with an IDD Prefix of the non-roaming location, and a follow-up number is the country code of the non-roaming location, it is required to replace the IDD Prefix of the non-roaming location with the IDD Prefix of the roaming location, and then the call application management module is notified to call out.

For example, if a number 00449876543211 is dialed in the roaming location America, this number is required to be calibrated as 011449876543211.

In step S408, the call application management module is mainly responsible for performing normal call connection processing on the dialed numbers on which calibration is performed and transmitted by the auxiliary calibration module or the dialed numbers not required to be calibrated, sending the numbers to the network, and completing the follow-up connection flow.

Thus far, the terminal auxiliary dialing function is implemented.

Figure 5:
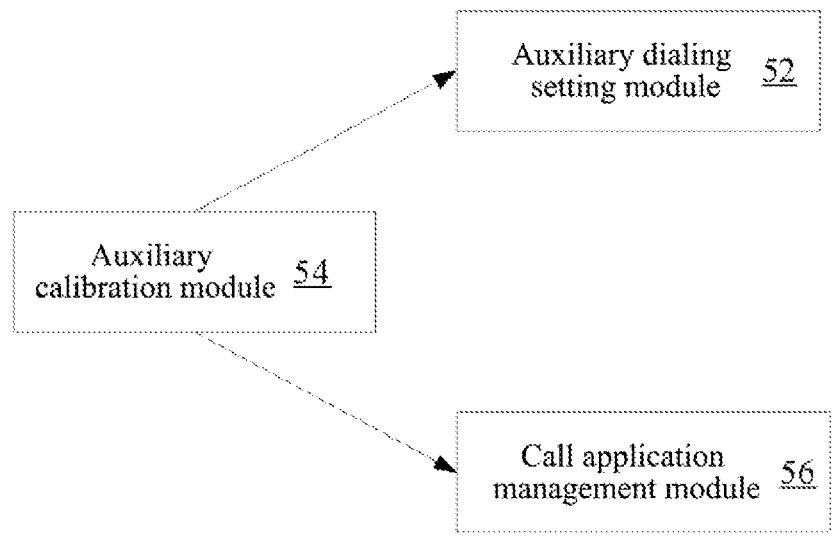
FIG. 5 is a block diagram of a structure of a device for terminal auxiliary dialing according to the preferred example of the present document.

Corresponding to the above method for terminal auxiliary dialing, a device for implementing processing of missed calls is also provided in the preferred example, FIG. 5 is a block diagram of a structure of the device for terminal auxiliary dialing according to the preferred example of the present document, and as shown in FIG. 5, the device can include: an auxiliary dialing setting module 52, an auxiliary calibration module 54 and a call application management module 56.

The auxiliary dialing setting module 52 mainly sets an auxiliary switch and an auxiliary data function. The auxiliary switch provides a switch of a subscriber dialing auxiliary calibration function, which makes the auxiliary function flexible and usable; the auxiliary data function provides basic data used for the auxiliary calibration function and provides calibration basis for the auxiliary calibration module, this part of data are normally accurate, and they are performed strictly according to international numbering plans defined by the International Telecommunication Union and specific number assignment principles of various countries. The auxiliary data include two major parts of data. 1. Home location information: including a home location country name, a Mobile Country Code (MCC), an International Direct Dialing (IDD) Prefix, a Domestic Direct Dialing (DDD) Prefix, and a length of the domestic direct distance dialed number; this part of information can be displayed according to the home location information registered by the subscriber. 2. Roaming location information: including a name of region country where the terminal is located currently, an MCC, an IDD Prefix and a DDD Prefix; this part of information can be displayed according to the current roaming location information of the subscriber.

The auxiliary calibration module 54 is connected with the auxiliary dialing setting module 52, the module is mainly responsible for calibrating the dialed number and performing auxiliary calibration on the data provided by the auxiliary dialing setting module. Whether the number dialed by the subscriber is correct or not and whether the auxiliary calibration needs to be performed are judged according to certain auxiliary calibration rules, the number dialed by the subscriber on which the auxiliary calibration is performed is basically a number that can be connected successfully, and then the number on which the auxiliary calibration is performed is transmitted to the call application management module for processing.

The call application management module 56 is connected with the auxiliary calibration module 54, the module is mainly responsible for performing normal call connection processing on the numbers on which the auxiliary calibration is performed and transmitted by the auxiliary calibration module or the numbers not required to be calibrated, sending the numbers to the network, and completing the follow-up call flow.

In conclusion, through the device for terminal auxiliary dialing in the preferred example, the device for auxiliary dialing processing can be introduced in the mobile terminal device in the original terminal dialing mode, and the device completes an auxiliary calibration process invocation for the number dialed by the subscriber with the technology of transmitting and processing signals between the three modules, which is simple and practicable. On one hand, a correctness of the number dialed by the subscriber can be improved, and guaranteeing a successful completion of connection; on the other hand, call loss is reduced for the network, and unnecessary network loads are decreased. Moreover, no signaling is added in the auxiliary dialing function in the preferred example, the normal implementation of other services of the mobile terminal is not influenced, and based on the implementation of dialing, further auxiliary calibration on the dialed number is implemented conveniently and flexibly, which promotes the network connection rate, thereby improving the user experience.

In another example, software is also provided, and the software is used for executing the above examples and the technical scheme described in the preferred examples.

In another example, a storage medium is also provided, the above software is stored in the storage medium, and the storage medium includes an optical disk, a floppy disk, a hard disk and an erasable memory, etc.

Apparently, the skilled in the art should understand that the modules or steps of the present document mentioned above can be implemented through a universal calculating device, and they can be integrated in a single calculating device or distributed in a network consisting of multiple calculating devices. Alternatively, the modules or steps can be implemented through program codes which can be executed by the calculating device, thus, they can be stored in a storage device to be executed by the calculating device, and in some cases, the illustrated or described steps can be executed in a sequence different from here, or they can be made into multiple integrated circuit modules respectively, or multiple modules or steps of them can be made into a single integrated circuit module to be implemented. Therefore, the example of the present document is not limited to any combination of hardware and software in a specific form.

The above description is only the preferred examples of the present document, which is not used to limit the technical scheme of the present document. The example of the present document can have various modifications and changes for the skilled in the art. All the modifications, equivalent substitutions, and improvements, etc. made within the spirit and principle of the present document shall fall into the protection scope of the present document.

INDUSTRIAL APPLICABILITY

With the method and device of the example of the present document, before the terminal calls out the dialed number, the dialed number of the subscriber is checked and corrected, thereby guaranteeing the correctness of the dialed number called out, solving the problem of higher network call loss rate in the related art, increasing a dialing success rate of the subscriber, and improving the user experience.

What is claimed is:
1. A dialing method, comprising:
a terminal acquiring dialing auxiliary data information, comprising: the terminal acquiring home location information registered when a subscriber opens an account, which comprises a Mobile Country Code, MCC, an International Direct Dialing Prefix, IDD Prefix, and a Domestic Direct Dialing Prefix, DDD Prefix; when the terminal roams, the terminal querying a Local IDD Prefix and DDD Prefix according to a MCC registered when a position of the subscriber updates;
after receiving a dialed number of a subscriber, the terminal judging whether the dialed number conforms to a dialing rule according to the dialing auxiliary data information, comprising:

in a case that the terminal performs dialing in a home location and a length of the dialed number is greater than a length of a domestic direct dialed number, the terminal judging whether the dialed number conforms to the dialing rule according to the home location information of the terminal;

in a case that the terminal performs dialing in a roaming location, the terminal judging whether the dialed number conforms to the dialing rule according to roaming location information of the terminal; and in a case that the terminal judges that the dialed number does not conform to the dialing rule, correcting the dialed number, and calling out the corrected dialed number.

2. The method according to claim 1, wherein the step of the terminal judging whether the dialed number conforms to the dialing rule according to the dialing auxiliary data information after receiving the dialed number of the subscriber comprises:

after the terminal receives the dialed number of the subscriber, judging whether an auxiliary dialing switch is ON;

in a case that the terminal judges that the auxiliary dialing switch is ON, judging whether the dialed number conforms to the dialing rule according to the dialing auxiliary data information; and in a case that the terminal judges that the auxiliary dialing switch is OFF, calling out the dialed number.

3. The method according to claim 1, wherein the step of the terminal judging whether the dialed number conforms to the dialing rule according to the home location information of the terminal after receiving the dialed number of the subscriber comprises:

in a case that the dialed number begins with a Domestic Direct Dialing (DDD) Prefix of the home location plus an area code, and the length of the dialed number is a sum of the length of the domestic direct dialed number plus a length of the DDD Prefix plus a length of the area code, the dialed number conforming to a dialing rule of domestic direct distance dialing; or, in a case that the dialed number begins with an International Direct Dialing (IDD) Prefix of the home location plus a country code, and the length of the dialed number is a sum of a length of an international direct dialed number plus a length of the IDD Prefix plus a length of the country code, the dialed number conforming to a dialing rule of international direct distance dialing; or, in a case that the terminal judges that the dialed number does not conform to the dialing rule, the dialed number not conforming to the dialing rule.

4. The method according to claim 3, wherein the step of correcting the dialed number in the case that the terminal judges that the dialed number does not conform to the dialing rule comprises:

in a case that the dialed number begins with the DDD Prefix of the home location and/or begins with the area code, the terminal correcting the dialed number according to the dialing rule of the domestic direct distance dialing; or, in a case that the dialed number begins with other numbers, the terminal correcting the dialed number according to the dialing rule of the international direct distance dialing.

5. The method according to claim 4, wherein the step of correcting the dialed number in the case that the terminal judges that the dialed number does not conform to the dialing rule comprises:

in a case that the dialed number begins with a non-numeric symbol, the terminal deleting the non-numeric symbol or replacing the non-numeric symbol with an array corresponding to the non-numeric symbol, and correcting the dialed number according to a beginning of the dialed number after the deletion or replacement.

6. The method according to claim 1, wherein before the step of the terminal judging whether the dialed number conforms to the dialing rule according to the home location information of the terminal, the method further comprises:

in a case that the length of the dialed number is the length of the domestic direct dialed number, the terminal calling out the dialed number.

7. The method according to claim 1, wherein the step of the terminal judging whether the dialed number conforms to the dialing rule according to the roaming location information of the terminal comprises:

in a case that the dialed number begins with a DDD Prefix of the roaming location plus an area code, and the length of the dialed number is a sum of the length of the domestic direct dialed number plus the length of the DDD Prefix plus the length of the area code, the terminal judging that the dialed number conforms to a dialing rule of domestic direct distance dialing of the roaming location; or, in a case that the dialed number begins with an IDD Prefix of the roaming location plus a country code, and the length of the dialed number is a sum of the length of the international direct dialed number plus the length of the IDD Prefix plus the length of the country code, the terminal judging that the dialed number conforms to a dialing rule of international direct distance dialing of the roaming location; or, in a case that the terminal judges that the dialed number does not conform to the dialing rule, the dialed number not conforming to the dialing rule.

8. The method according to claim 7, wherein the step of correcting the dialed number in the case that the terminal judges that the dialed number does not conform to the dialing rule comprises:

in a case that the dialed number begins with the IDD Prefix of the roaming location and/or begins with the country code of the roaming location, the terminal correcting the dialed number according to the dialing rule of the domestic direct distance dialing of the roaming location; or, in a case that the dialed number begins with other numbers, the terminal correcting the dialed number according to the dialing rule of the international direct distance dialing of the roaming location.

9. The method according to claim 8, wherein the step of correcting the dialed number in the case that the terminal judges that the dialed number does not conform to the dialing rule comprises:

in a case that the dialed number begins with a non-numeric symbol, the terminal deleting the non-numeric symbol or replacing the non-numeric symbol with an array corresponding to the non-numeric symbol, and correcting the dialed number according to a beginning of the dialed number after the deletion or replacement.

10. A terminal, comprising a processor configured to:
acquire dialing auxiliary data information, comprising: acquiring home location information registered when a subscriber opens an account, which comprises a Mobile Country Code, MCC, an International Direct Dialing Prefix, IDD Prefix, and a Domestic Direct Dialing Prefix, DDD Prefix, and querying a Local IDD Prefix and DDD Prefix according to a MCC registered when a position of the subscriber updates, when the terminal roams;

after the terminal receives a dialed number of a subscriber, judge whether the dialed number conforms to a dialing rule according to the dialing auxiliary data information; comprising:

in a case that the terminal performs dialing in a home location and a length of the dialed number is greater than a length of a domestic direct dialed number, the terminal judging whether the dialed number conforms to the dialing rule according to the home location information of the terminal;

in a case that the terminal performs dialing in a roaming location, the terminal judging whether the dialed number conforms to the dialing rule according to roaming location information of the terminal;

and in a case that the dialed number does not conform to the dialing rule, correct the dialed number, and call out the corrected dialed number.

11. The terminal according to claim 10, wherein, the processor is further configured to:

after the terminal receives the dialed number of the subscriber, judge whether an auxiliary dialing switch is ON;

in a case that the auxiliary dialing switch is ON, judge whether the dialed number conforms to the dialing rule according to the dialing auxiliary data information; and in a case that the auxiliary dialing switch is OFF, call out the dialed number.

* * * * *